Patented June 1, 1948

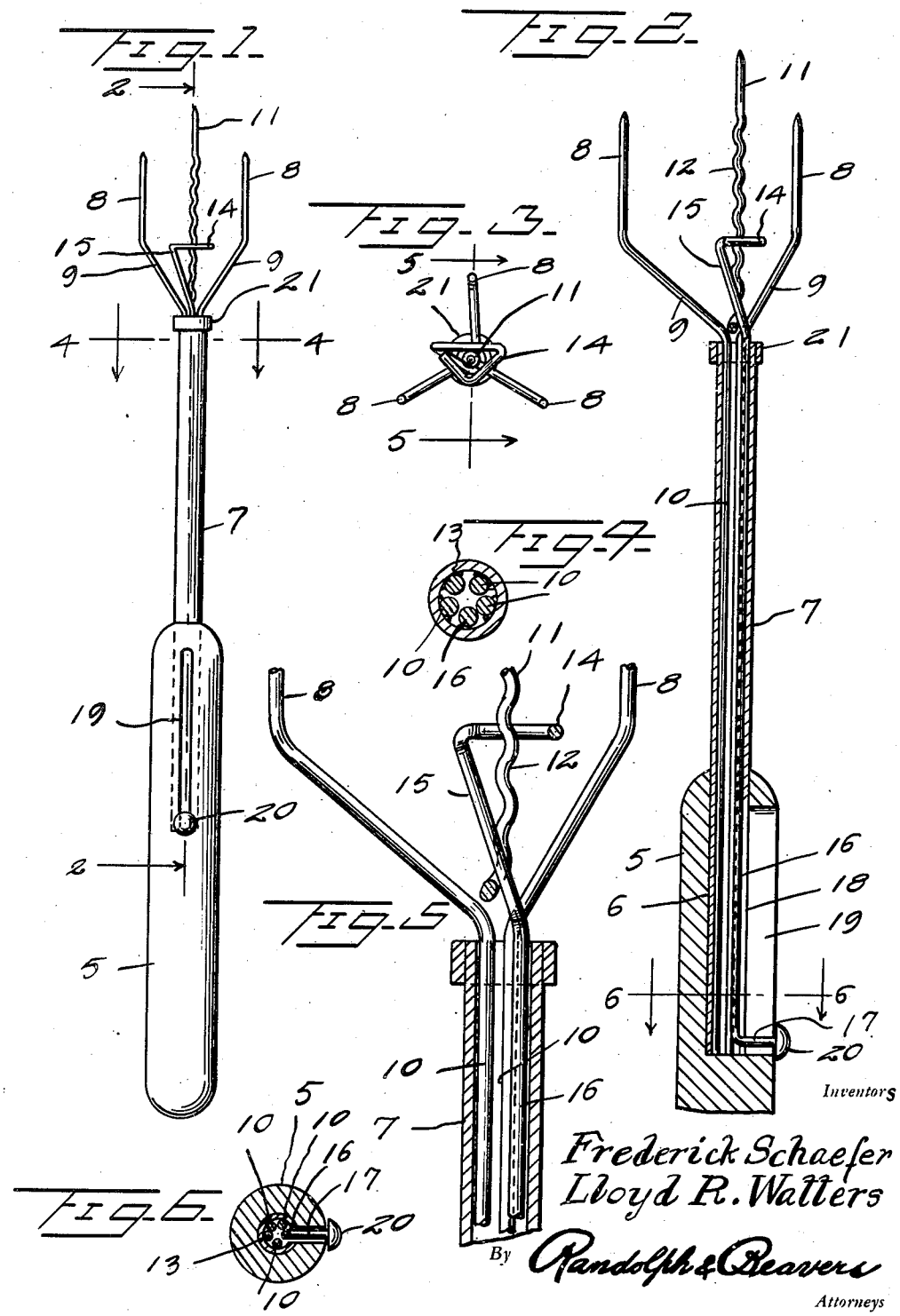

2,442,551

UNITED STATES PATENT OFFICE 2,442,551

KITCHEN FORK WITH EJECTOR

Frederick Schaefer and Lloyd R. Watters, North Plainfield, N. J.

Application May 8, 1946, Serial No. 668,209

2 Claims. (Cl. 30—129)

This invention appertains to improvements in a kitchen fork with ejector and more particularly to an implement for lifting and holding hot beets, boiled potatoes, while being skinned, and also for lifting pickles, olives and various other vegetables.

An important object of the invention is to provide a kitchen implement for lifting various foodstuffs and wherein means is provided for detaching the foodstuffs from the implement when it is desired to drop the same into a bowl or onto a dish.

Another important object of the invention is to provide a kitchen implement of the character stated which includes tines and a dislodging member for foodstuffs held by the tines, and wherein the tines have shank portions defining a guide for the shank of the dislodging member.

A further object of the invention is to provide a simple hand implement for kitchen use in picking up various articles of food which will positively impale an article of food, as while the same is in boiling water, and regardless of the softness of the food article.

Still a further object of the invention is to provide an implement of the character stated which is of simple construction and capable of being manufactured at low cost.

These and other objects and advantages of the invention will become apparent to the reader of the following description.

In the drawing:

Figure 1 is a side elevational view of the implement.

Figure 2 is a longitudinal sectional view taken substantially on line 2—2 of Figure 1.

Figure 3 is a top plan view of the implement, looking toward the tines.

Figure 4 is a cross-section taken on line 4—4 of Figure 1.

Figure 5 is a fragmentary detailed sectional view through the outer portion of the guide tube and showing portions of the tines and expelling member.

Figure 6 is a section taken substantially on line 6—6 of Figure 2.

Referring to the drawing, numeral 5 denotes an elongated handle which may be of wood, plastic or any other desirable material, one end of which has a longitudinally extending bore 6 formed therein to receive the inner end portion of an elongated guide tube 7, preferably of metal.

A plurality of tines 8 are provided with oblique inner portions 9, merging with elongated rods or shanks 10 disposed longitudinally in the guide tube 7.

There is also a center prong 11, somewhat longer than the other prong 8 and this has a waved or undulated portion 12 to cause a more positive engagement of the particular tines, with the assistance of the other tines, in hot and soft foodstuffs. The tine 11 extends from an elongated rod or shank 13 which extends longitudinally in the guide tube 7. A pusher frame or head 14 surrounds the long tine 11 and has an oblique portion 15 extending to connect to a rod or shank 16, which extends longitudinally in the tube 7.

As is apparent, in Figure 4, the shanks 10 and 13 are arranged, and preferably welded in place so as to afford a guide slot or guide-way from the shank 16, which as shown in Figure 2 has a laterally disposed inner end portion 17 projecting through registering slots 18 and 19 in the tube 7 and handle 5 respectively. The outwardly disposed portion 17 of the shank 16 has a push knob 20, whereby the portion 17 can be slid longitudinally of the slots 18, 19, as when the head 14 is being pushed along the tine 11 to discharge an article therefrom.

The outer end of the tube 17 may be reinforced by a spot welded or otherwise secured collar 21.

It can now be seen, that in the use of the implement, the knob 20 will be first disposed in the retracted position shown in Figure 2. The tines can now be pushed into a boiled potato or boiled beet and the article lifted, due to the undulated formation of the tine 11, the food article will not easily drop off the tine, but by pushing the button 20 in a forward direction, the pusher head 14 will move the food article outwardly on the tines 8, 9, so that the article will drop off onto a plate or other receptacle.

The device can be built with a streamlined appearance, with the tines rather close together and substantially long, and with the handle 5 having its end portions rounded off, as substantially shown in Figure 1. The utensil can be made even more attractive by having the handle 5 and tube 7 of different colors, with the handle perhaps of a plastic.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A kitchen implement comprising a tubular member, a plurality of tines projecting from one end of the tubular member, a center tine projecting from the same end of the tubular member, a pusher element surrounding the center tine and provided with an enlongated shank extending longitudinally in the tubular member, said tubular member having a slot therein, said shank having a lateral portion projecting through the slot and adapted to be pushed longitudinally of the slot when the pusher element is used to dislodge food from the tines, said first mentioned tines being provided with elongated shanks extending longitudinally in the tubular member to form a guideway for the shank of the pusher element.

2. A kitchen implement comprising a tubular member, a plurality of tines projecting from one end of the tubular member, a center tine projecting from the same end of the tubular member, a pusher element surrounding the center tine and provided with an elongated shank extending longitudinally in the tubular member, said tubular member having a slot therein, said shank having a lateral portion projecting through the slot and adapted to be pushed longitudinally of the slot when the pusher element is used to dislodge food from the tines, said tines being all provided with shanks extending longitudinally in the tubular member to define a slide-way for the shank of the pusher element.

FREDERICK SCHAEFER.
LLOYD R. WATTERS.

REFERENCES CITED

The following references are of record in the file of this patent:

UNITED STATES PATENTS

| Number | Name | Date |
|---|---|---|
| 732,675 | Cochran | June 30, 1903 |
| 1,343,811 | Denman | June 15, 1920 |
| 1,443,508 | Small | Jan. 30, 1923 |

FOREIGN PATENTS

| Number | Country | Date |
|---|---|---|
| 307,229 | Italy | Apr. 24, 1933 |